United States Patent
Bharadwaj et al.

(10) Patent No.: US 11,474,731 B1
(45) Date of Patent: Oct. 18, 2022

(54) METHODS AND SYSTEMS FOR EVENTUALLY-COMPLETE BACKUPS

(71) Applicant: Veritas Technologies LLC, Santa Clara, CA (US)

(72) Inventors: Vaijayanti Rakshit Bharadwaj, Maharashtra (IN); Chirag Dalal, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 12 days.

(21) Appl. No.: 16/993,717

(22) Filed: Aug. 14, 2020

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,924,355 B1* | 12/2014 | Kundzich | ........... | G06F 11/1458 |
| | | | | 707/647 |
| 9,372,761 B1* | 6/2016 | Chai | ................... | G06F 11/1446 |
| 9,424,136 B1* | 8/2016 | Teater | .................... | G06F 3/065 |
| 2008/0307019 A1* | 12/2008 | Weiss | ................... | G06F 11/1451 |
| 2018/0181308 A1* | 6/2018 | Kamiura | ............. | G06F 11/1451 |
| 2018/0285435 A1* | 10/2018 | Richter | ................... | G06F 11/14 |

* cited by examiner

*Primary Examiner* — Jason W Blust
(74) *Attorney, Agent, or Firm* — Campbell Stephenson LLP

(57) ABSTRACT

Disclosed are techniques that provide for eventually-complete backups, and restoration thereof. For example, such methods, computer program products, and computer systems can include initiating a backup operation (where the backup operation is configured back up a dataset), detecting termination of the backup operation, detecting termination of the backup operation, and determining whether the backup operation backed up the dataset completely. In response to a determination that the backup operation did not backup the dataset completely, generating an indication that the backup is not complete. In response to a determination that the backup operation did not backup the dataset completely, generating an indication that the backup is complete.

20 Claims, 14 Drawing Sheets

Backup Progression 600

METHODS AND SYSTEMS FOR EVENTUALLY-COMPLETE BACKUPS

FIELD OF THE INVENTION

The present disclosure relates to methods and systems for data backup, and more specifically, to methods and systems for eventually-complete backups, and restoration thereof.

BACKGROUND

An ever-increasing reliance on information and computing systems that produce, process, distribute, and maintain such information in its various forms, continues to put great demands on techniques for providing data storage, accessing that data storage, and protecting the data thus stored. Business organizations can produce and retain large amounts of data. While data growth is not new, the pace of data growth is continually increasing, the location of data more dispersed, and linkages between datasets more complex. Techniques such as data deduplication and backup offer business organizations an opportunity to dramatically reduce an amount of storage required for such data backups and other forms of data storage and to more efficiently communicate backup data to one or more backup storages sites, and provide protection for an organization's data in the process.

SUMMARY

The present disclosure describes methods, computer program products, computer systems, and the like that provide for eventually-complete backups, and restoration thereof, in an efficient and effective manner. Such methods, computer program products, and computer systems include initiating a backup operation (where the backup operation is configured back up a dataset), detecting termination of the backup operation, detecting termination of the backup operation, and determining whether the backup operation backed up the dataset completely. In response to a determination that the backup operation did not backup the dataset completely, generating an indication that the backup is not complete. In response to a determination that the backup operation did not backup the dataset completely, generating an indication that the backup is complete.

In one embodiment, the backup operation produces a partial backup image, and the method can also include, in response to the indication that the backup is not complete, storing progress information, where the progress information indicates data of the dataset that has been backed up. The backup operation can produce a backup image, with the backup image being a partial backup image. Further, the partial backup image is one of a plurality of partial backup images, and the backup operation results in the plurality of partial backup images. Further still, the dataset can include a plurality of data chunks, and the partial backup image can include one or more data chunks of the plurality of data chunks.

In other embodiments, the backup operation can include selecting a data chunk of the one or more data chunks as a selected data chunk and backing up the selected data chunk. Further, the selected data chunk can be one of a new data chunk or an existing data chunk. Further still, the termination can be a result of an end of a backup window.

In still other embodiments, such a method can also include retrieving progress information and causing the backup operation to be initiated at a point in the dataset indicated by the progress information.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
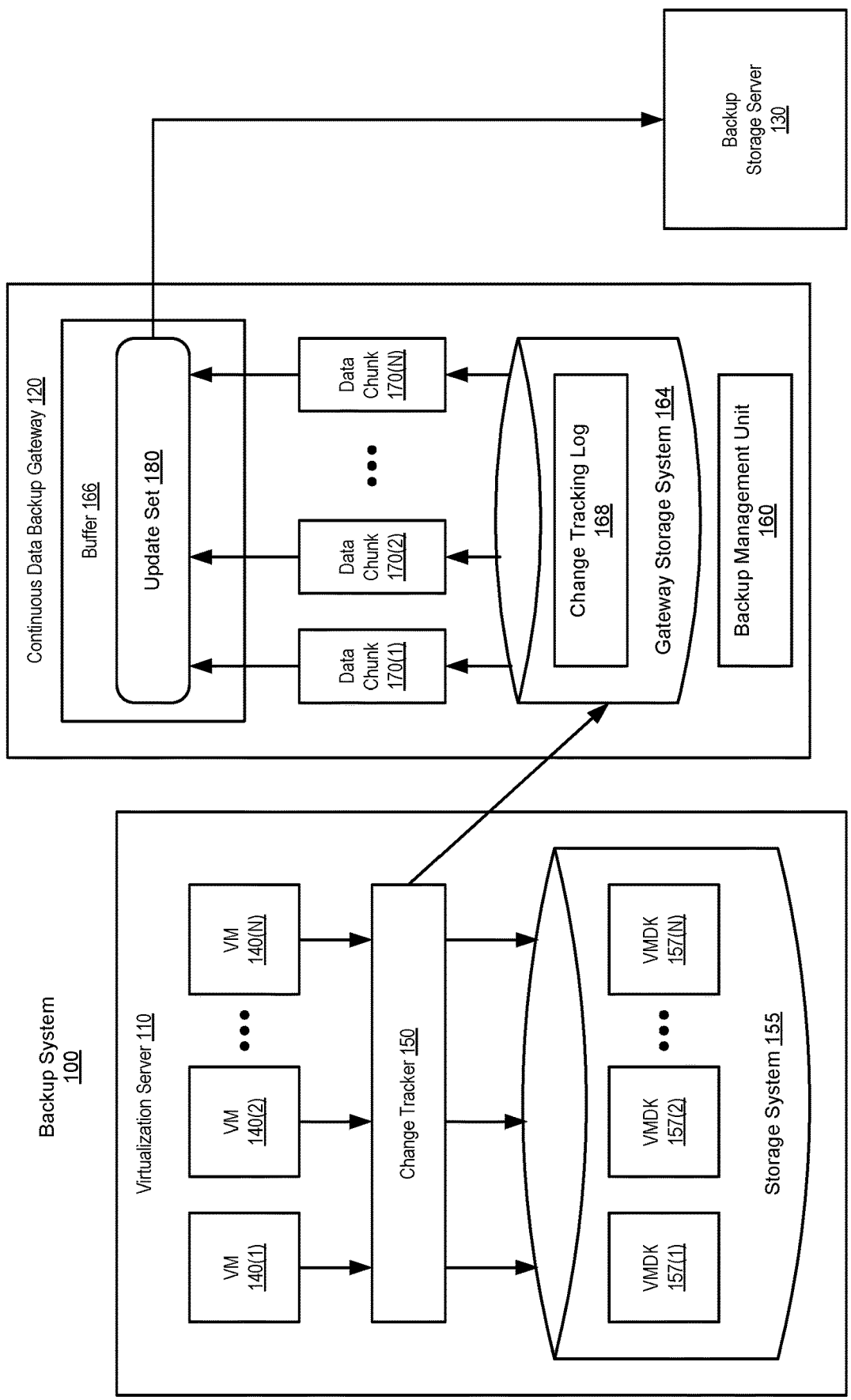
FIG. 1 is a simplified block diagram illustrating components of an example backup system that supports change tracking, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Thus, because the methods and systems described herein are susceptible to various modifications and alternative forms, it will be appreciated that specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for eventually-complete backups, and restoration thereof. Broadly, the concepts described herein are applicable to the backup of data, and more particularly, to methods and systems for creating eventually-complete backups through the creation and maintenance of a series of partial backup images of a dataset and information regarding the progress made in creating a complete backup of the dataset thereby.

In so doing, methods and systems such as those described herein provide flexible, efficient, and effective techniques for creating the aforementioned partial backup images and maintenance of associated information. There are numerous situations in which, for a variety of reasons, a data backup may need to be interrupted. For example, the first full backup can be extensive in any backup system, because the first full backup includes the given dataset in its entirety. In a continuous data protection system, a change tracker (also referred to as a change block tracker, an input/output (I/O) tap, and/or comparable descriptions) is installed between and application and a storage system. Such a change tracker passes the data being written to the computer system's storage system, and also to a gateway that logs the data to a staging area. The gateway then periodically sends the data to a backup system. In such architectures, there are a number of scenarios in which completing the backup can prove problematic.

First, in situations in which an initial full synchronization of an entire dataset is performed, the entire dataset is sent, along with newly written data, to the gateway. Depending on the amount of data sent, the gateway may not have a sufficient amount of storage to cache the entire dataset before sending its data to the backup system. In view of such constraints, the change block tracker should send data to the backup system only as and when the change block tracker's storage is filled to a capacity approaching a given threshold.

Second, in situations in which a failure in a network connection between a change tracker and gateway occurs (or insufficient network bandwidth is available), or the gateway is unable to keep up with the frequency of right operations performed on the primary storage, the gateway goes in "diff-sync mode" (in which the change tracker stops sending data to the gateway, but maintains information regarding which blocks remain to be sent). At a later point in time, when the workload subsides (or network recovers/recovers sufficient bandwidth, or when space becomes available), the change tracker sends such remaining data, as per the information maintained. Unfortunately, at this juncture, the state of the data is not even crash consistent. However, this data may still need to be sent to the backup server to make sure the staging space is freed.

Such problems can also be encountered in other circumstances and systems. For example, a scale-out database that maintains large amounts of data in its cluster can present challenges when attempting to backup their data. While backing up such data, it is possible that a full backup may take a very long time (and so, substantially longer than the available backup window), and so need to be run over multiple backup windows. Using traditional methods, which require such multiple backup windows, multiple backup images are created. This results in deduplication occurring in multiple stages, and each stage creating a backup image, that represent only a portion of the dataset at the time that portion was backed up. This not only results in less effective deduplication, but also destroys any consistency a single backup would normally display.

However, according to embodiments such as those described herein, a mechanism is provided that allows a backup system according thereto to account for such complications. To accomplish this end, embodiments such as those described herein provide for the creation of partial backup images that reflect the state of a dataset at a given time, despite having been created at different points in time, until the dataset's data has been backed up in what is referred to herein as an eventually-complete backup.

Once such an eventually-complete backup is complete, the image is marked as being complete, which implies that the backup is now consistent and, from that point onwards, restorable. Further, such eventually-complete backups can be based on full backups, incremental backups, or other such backups. And while only backup images that are restorable may be shown to the user for restoration, if the data chunks that form a given partial backup are unitary/internally consistent (e.g., files, database tables, data objects, or the like), such partial backups can allow for restoration of such data chunks. In embodiments such as those described herein, aside from the first partial backup, subsequent partial backups (to the point of the last partial backup that completes the complete backup) reference data chunks from previous partial (or in certain embodiments, inconsistent) backup images. As noted subsequently, backup systems that support backup synthesis can synthesize a full image from multiple partial backup images by taking a union of certain backup types. In the case of block-based backups of virtual disks, such restoration can synthesize a full backup by taking latest versions of the data blocks in question. Similarly, partial/inconsistent backup images can also be replicated or sent to the cloud, but, as before, will not be restorable until the arrival of a later image that is consistent and completes the backup in question (save for partial backup images that include data chunks that are themselves unitary and internally consistent, as noted subsequently). It is to be further appreciated that methods and systems such as those described herein can be applied to any manner of backup operations, including, for example, full backups, incremental backups, and other such backup operations.

Example Backup Architectures

FIG. 1 is a simplified block diagram illustrating components of an example backup system that supports change tracking, according to one embodiment. FIG. 1 thus illustrates a backup system 100, which includes one or more virtualization servers (one of which is depicted in FIG. 1 as a virtualization server 110) that provides changed data and information regarding same (e.g., metadata) to a continuous data backup gateway 120. Continuous data backup gateway 120 then provides data to a backup storage server 130, in the form of one or more update sets, under the control of a backup management unit (discussed subsequently).

As just noted, virtualization server 110 serves as an example of such systems (e.g., appliances), and can be seen to include a number of components. These components can include one or more virtual machines (VMs; depicted in FIG. 1 as VMs 140(1)-(N), and referred to in the aggregate as VMs and 40), one or more change trackers (an example of which is depicted in FIG. 1 as a change tracker 150), and one or more storage systems (an example of which is depicted in FIG. 1 as a storage system 155). As is also depicted in FIG. 1, storage system 155 stores and one or more virtual disks (also referred to as virtual machine disks (VMDK); examples of which are depicted in FIG. 1 as VMDKs 157(1)-(N), and referred to in the aggregate as VMDKs 157).

Continuous data backup gateway 120, in turn, includes a backup management unit 160, which interacts with change tracker 150 to collect (and, ultimately, effect the storage of) one or more data chunks (as data is referred to herein). As will be appreciated in light of the present disclosure, the use of the term "data chunk" herein is simply a matter of convenience, such an amount of data being able to represent a data segment, a block of data, and extent of data, or other such unit of data. The term "data chunk" is also intended to comprehend unitary and internally consistent amounts of data, such as a file, database table, or other such integral collection of data. Continuous data backup gateway 120 can also include, for example, a gateway storage system 164 and a buffer 166, communicatively coupled to one another.

In operation (and as described in greater detail subsequently in connection with FIGS. 2 and 3), continuous data backup gateway 120 receives changed data from change tracker 150. In certain embodiments, change tracker 150 can be implemented as a change block tracker, and changed data blocks (or other such units of data) transferred upon there being written by one or more of VMs 140. Change tracker 150 also passes such written data to one or more of VMDKs 157 for storage. When continuous data backup gateway 120 receives such changed data from change tracker 150, backup management unit 160 can store the changed data received in, for example, a change tracking log 168. Backup management unit 160 can transfer the changed data stored in change tracking log 168 two buffer 166. An example of such a transfer is depicted in FIG. 1 with the transfer of data chunks 170(1)-(N) from change tracking log 168 to buffer 166, where data chunks 170(1)-(N) are stored as an update set 180. Update set 180 is then transferred, subsequently, by backup management unit 160, from buffer 166 to backup storage server 130.

As will be appreciated from the foregoing, the letter N is used to indicate a variable number of devices or components. For example, a variable number of clients are implemented in the backup system. Although the letter N is used in describing a variable number of instances of each of these different devices and components, a repeated use of the letter N does not necessarily indicate that each device and component has a same number of N instances implemented in the backup system.

Figure 2:
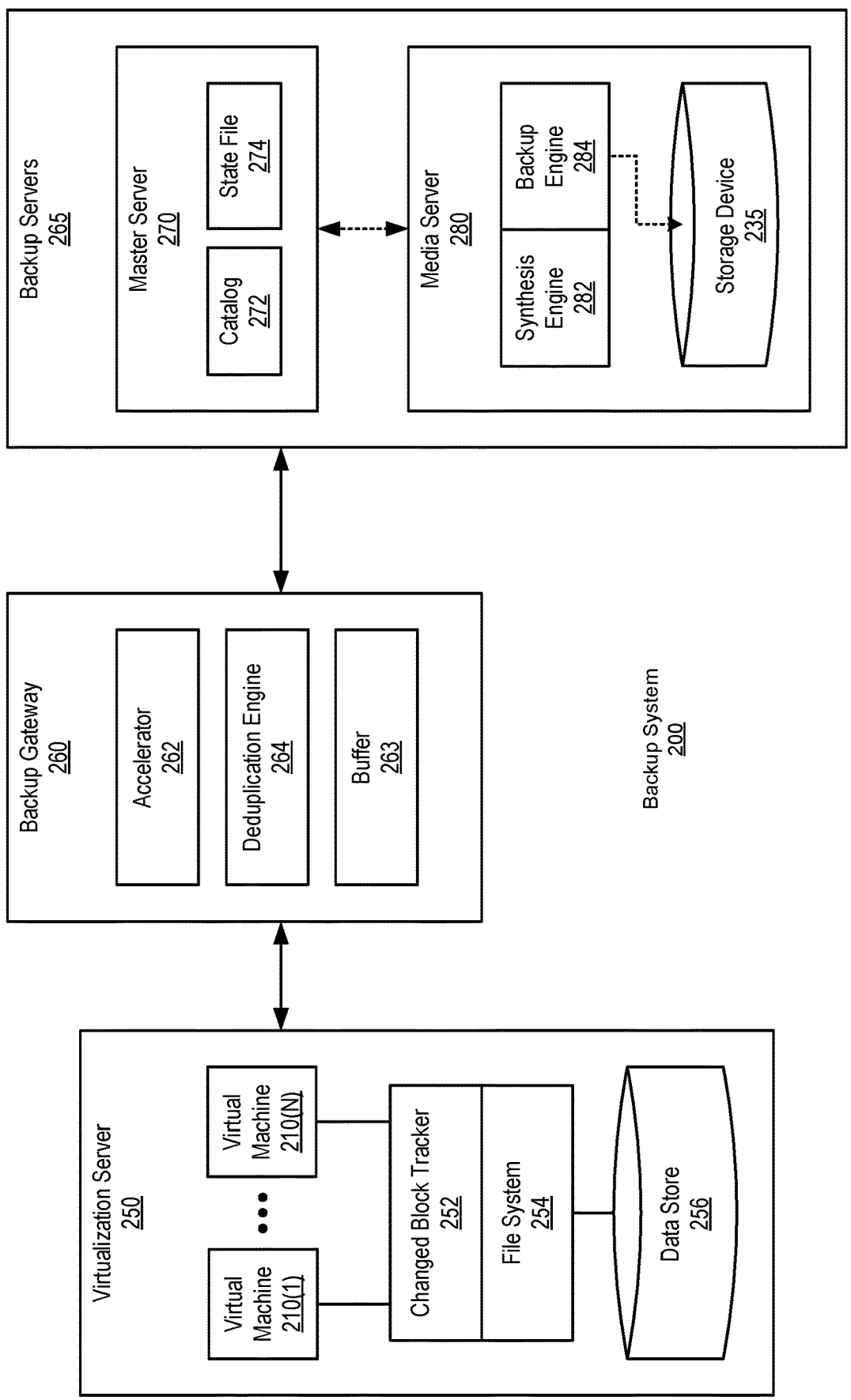
FIG. 2 is a simplified block diagram illustrating, in greater detail, components of an example backup system that supports change tracking, according to one embodiment.

FIG. 2 is a simplified block diagram illustrating, in greater detail, components of an example backup system that supports change tracking, according to one embodiment. FIG. 2 depicts a backup system 200 that can include, for example, a virtualization server 250, a backup gateway 260, and backup servers 265 (e.g., a master server 270 and a media server 280). Hypervisor server 250 supports one or more virtual machines (e.g., depicted in FIG. 2 as virtual machines 210(1)-(N), and referred to in the aggregate as virtual machines 210), and includes a changed block tracker 252, a file system 254, and a data store 256. Backup gateway 260 includes an accelerator 262, a buffer 263, and a deduplication engine 264. Master server 270 includes a catalog 272 and a state file 274. Media server 280 includes synthesis engine 282 and backup engine 284. Backup engine 284 is coupled to storage device 235, which can be used to store one or more backup images of one or more corresponding backup sets. It will be appreciated that, while state file 274 is depicted as being maintained at master server 270, such need not necessarily be the case. State file 274 can, in fact, be maintained at media server 280 or at any location in the storage systems of FIGS. 1 and 2, for example.

To create a backup stream (such as that described in connection with FIG. 3), accelerator 262 can obtain changed units of data from buffer 263. Changed units of data (e.g., disk sectors) can be tracked by changed block tracker 252, for example. As such changes are identified, changed units of data from virtual machines 210 can be sent to backup gateway 260. Next, state file 274, which stores information about each unit of data (e.g., about each extent of data on a virtual disk), is retrieved from master server 270. State file 274 includes information about units of data that have already been backed up to storage device 235 by backup engine 284 (e.g., as part of a preceding partial backup). These change units of data can be combined with those stored in buffer 263, in the manner described.

Based on information in state file 274, accelerator 262 can generate a backup stream (e.g., as described in connection with FIG. 3) by combining changed units of data with a list of units of data that have been already backed up (e.g., information identifying existing units of data in one or more preceding partial backups, as obtained from state file 274). Accelerator 262 then transfers this combined data and information to deduplication engine 264 as a backup stream. Once this combined data is deduplicated (e.g., to remove units of data that have already been backed up), the next partial backup (or complete backup) can be generated on media server 280 (e.g., by synthesis engine 282). State file 274 is then updated by media server 280 and transferred to master server 270 after the partial (complete) backup in question is performed.

It should be noted that accelerator 262 need only generate catalog data for the changed units of data. When media server 280 generates the next partial backup (or complete backup), accelerator 262 transfers catalog information (e.g., information regarding the location of the units of data in a backup image) for the partial backup in question, to master server 280.

Figure 3:
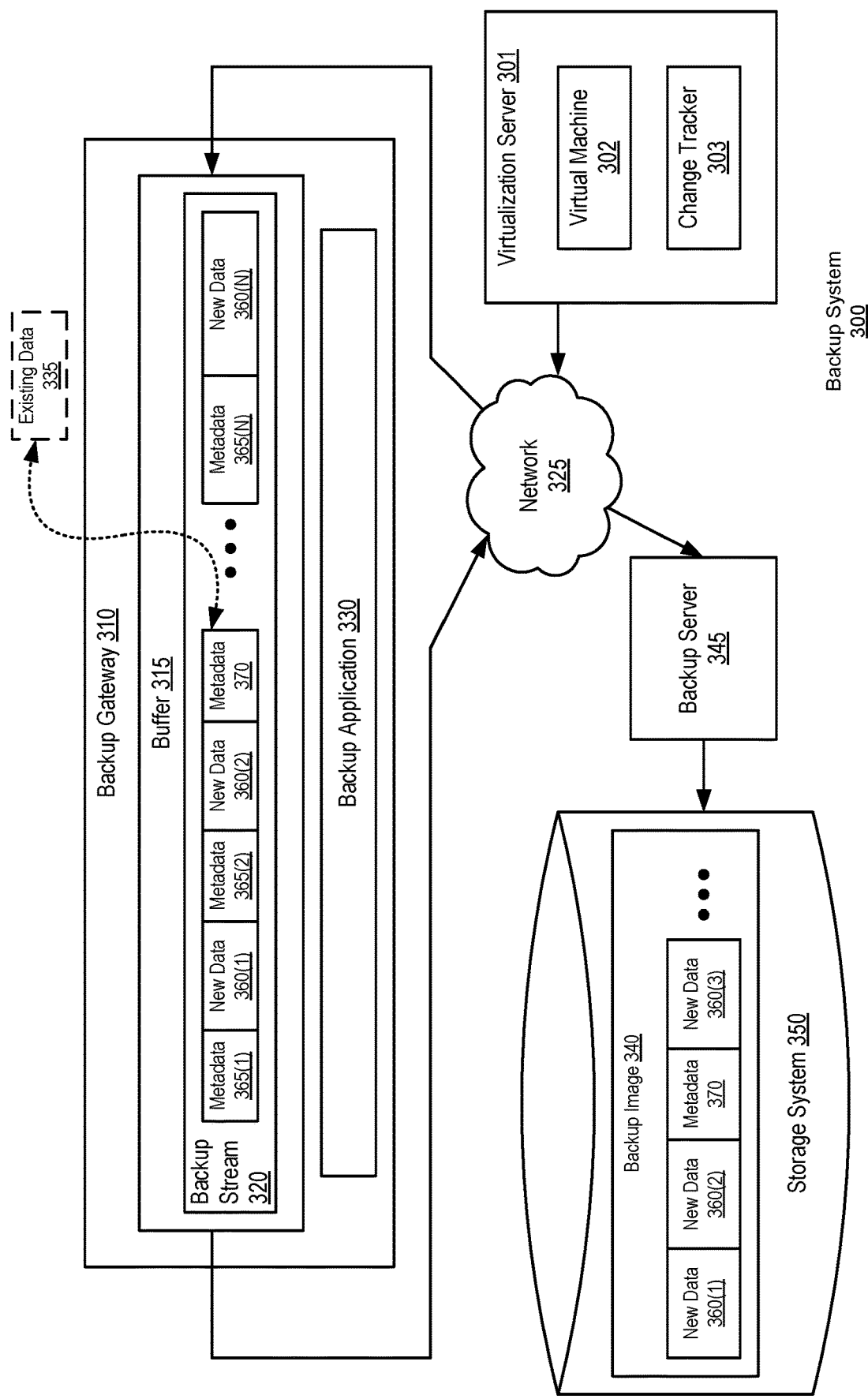
FIG. 3 is a simplified block diagram illustrating components of an example backup system that supports change tracking, showing an example of a backup stream, according to one embodiment.

FIG. 3 is a simplified block diagram illustrating components of an example backup system that supports change tracking, showing an example of a backup stream, according to one embodiment. FIG. 3 thus depicts a backup system 300 in which a computing system (a virtualization server 301, which executes a virtual machine 302 and a change tracker 303) sends changed units of data to a backup gateway 310. In a buffer 315 of backup gateway 310, backup gateway 310 creates a backup stream 320. Buffer 315 stores backup stream 320, which includes one or more changed units of data from virtualization server 301 (received, e.g., via the Internet, a storage area network (SAN), or network 325, among other mechanisms). In the embodiment depicted in FIG. 3, backup gateway 310 also includes a backup application 330. Backup application 330 can, in addition to other functionality, provide functionality that facilitates a determination to be made as to whether a given unit of data has already been backed up.

For example, such functionality can include the management of metadata of existing units of data (those that may have already been backed up) and new units of data (those units of data that have changed (modified by a write operation), and are thus needing to be backed up). In such an example, an existing unit of data 335 (e.g., a unit of data that has not been changed (modified by a write operation) by virtual machine 302) is represented in backup stream 320 by metadata 370, backup stream 320 being stored by a backup server 345 in a storage system 350. As noted, an accelerator such as accelerator 162 can access state information (e.g., state file 174) to determine whether an existing storage unit has been previously backed up. As will be appreciated in light of the present disclosure, backup stream 320 can, and often will, include a number of units of metadata representing existing units of data. Also included in backup stream 320 are a number of new units of data (depicted as new units of data 360(1)-(N), and referred to in the aggregate as new units of data 360). Both existing and new units of data are described by corresponding units of metadata (depicted as metadata 365(1)-(N), and referred to in the aggregate as metadata 365)

In one embodiment, backup application 330 makes determinations as to whether the various units of data should be included in backup stream 320, and in doing so, can cause new units of data 360(1), 360(2), and 360(N) in backup stream 320. Similarly, backup application 330 can also (or in the alternative) determine whether existing units of data (e.g., existing unit of data 335) should be represented in a backup image such as backup image 340, in which case the metadata therefor (e.g., metadata 370) can be stored therein.

Figure 4:
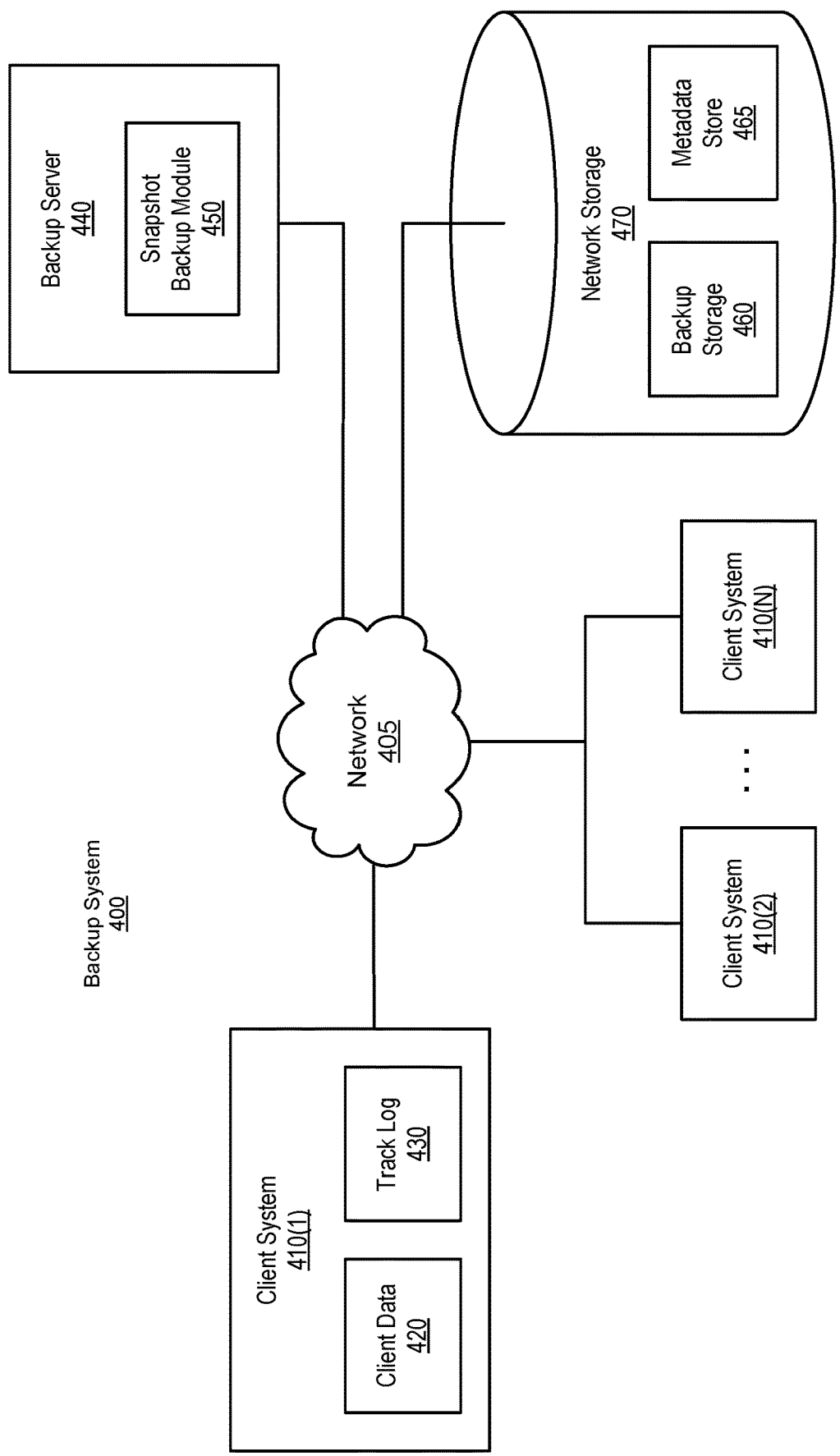
FIG. 4 is a simplified block diagram illustrating components of an example backup system that supports a backup process that employs snapshots, according to one embodiment.

FIG. 4 is a simplified block diagram illustrating components of an example backup system that supports a backup process that employs snapshots, according to one embodiment. FIG. 4 thus depicts certain components of a backup system 400, which can employ certain embodiments of the present disclosure. Backup system 400 includes a network 405 that communicatively couples one or more client systems 410(1)-(N), a backup server 440, and network storage 470. Each component is discussed in further detail below.

One or more client systems 410(1)-(N), also referred to herein as client devices 410 and/or clients 410, can be implemented using, for example, a desktop computer, a laptop computer, a workstation, a server, or the like. One or more clients 410(1)-(N) can be configured to communicate with backup server 440 via network 405. An example of network 405, which can be used by clients 410(1)-(N) to access backup server 440, is a local area network (LAN) utilizing Ethernet, IEEE 802.11x, or some other communications protocol. While FIG. 4 illustrates client system 410(1) as including client data 420 and track log 430, each client system can store different client data and track log information in storage local to the client system.

Client data 420 can include various data that is generated and/or consumed by applications employed by a user of client system 410(1). Client data 420 can also include executable files, such as those used to implement applications and operating systems, as well as files that are used or generated by such executable files. Client data 420 can include files generated by user applications (e.g., word processing programs, email programs, graphics programs, a database application, or the like) executing on client 410(1). Some of client data 420 may also be transferred to backup server 430 via a network 405 to be included in backup storage 460 (e.g., stored as part of a backup image in backup storage 460). Each client 410 can send different client data 420 to backup server 440.

Backup server 440 is also coupled to network 405. Backup server 440 can include one or more physical servers (e.g., one or more media servers) configured to perform a variety of tasks related to management and implementation of backup services for backup system 400, such as performing a full or partial backup of a client system. In the system illustrated in FIG. 4, backup server 440 is further configured to communicate with backup storage 460 and metadata store 465 for purposes of storing backup data of client systems 410(1)-(N) in resources controlled by backup server 440 (e.g., in a storage device controlled by a media server, which are both controlled by backup server 440).

Backup storage 460 is a storage area in which backup data (e.g., backup images) can be stored. Metadata store 465 is a storage area in which metadata about backup data can be stored (e.g., a central index that includes backup image identifications, locations of backup images, lists of files included in backup images, fingerprints of files, and the like). Backup server 440 can communicate with backup storage 460 via network 405 or via a direct link between the backup server 440 and backup storage 460 (not shown).

Backup storage 460 and metadata store 465 can be stored in network storage 470. Network storage 470 can be implemented as network attached storage (NAS), file servers, storage filers, and/or network shares. Network storage 470 can be implemented as a single storage device or as a collection of storage devices. Network storage 470 can also be implemented as a storage area network (SAN), which couples remote storage devices to a server (e.g., a storage server), such that the remote storage devices appear as locally-attached storage devices to the server's OS, for example. Network storage 470 can include a data volume.

Backup services can be implemented in backup system 400 as a client-server application (not shown), with a server component (e.g., residing on backup server 440) and a client component (e.g., residing on client 410) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 440 can be configured to perform tasks that include communicating with clients 410 to initiate backup tasks on the clients, maintaining databases related to files and other information backed up from file systems associated with the clients, and managing or tracking resources that store backups of clients 410.

Embodiments of the present disclosure can be implemented in a snapshot backup module 450, which is configured to store backup images on backup storage 460 using snapshots, such as snapshot virtual disks. Other types of snapshots can also be used, such as file system snapshots, and/or volume snapshots. In one embodiment, each unit (e.g., virtual disk, file system, and/or volume) and each snapshot of a unit stores a single backup image. Snapshot backup module 450 can be implemented in backup server 440.

As will be appreciated, a snapshot is a set of techniques used (e.g., in high-availability systems) that facilitate the maintenance of the state of data at a given point in time. To such techniques are copy-on-write and redirect-on-write. The first of these techniques, copy-on-write, maintains a virtual copy of the data at the given point in time by copying original data to another location, prior to executing write operations on that data's original location. By contrast, the latter technique, redirect-on-write, performs the write operation to another location, and leaves the original data in the original location unchanged. As will be appreciated, in either case, the longer snapshots are maintained, the greater the resulting overhead (both in terms of the storage consumed by mapping information, as well as the computational burden resulting from data fragmentation).

In response to receipt of a traditional full backup image (which includes a complete copy of client data) at backup server 440, snapshot backup module 450 is configured to allocate storage (e.g., a virtual disk, a file system, and/or a volume) and store the traditional full backup image in the new storage thus created. In response to receipt of a backup stream (which includes changed client data and metadata identifying unchanged client data in a base backup image) at backup server 440, snapshot backup module 450 is configured to identify base data (e.g., virtual disk, file system, and/or volume) that includes the base backup image with which the backup stream has an inclusion relationship, take a snapshot of the (identified) base storage unit (which generates or produces a snapshot, such as a snapshot virtual disk), and perform a backup operation on the snapshot.

In light of the present disclosure, it will be appreciated that network storage 470 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, backup system 400 and network 405 can include other components such as routers, firewalls and the like that are not germane to the discussion of the present disclosure and will not be discussed further herein. It will also be appreciated that other configurations are possible. For example, clients 410(1)-(N) can be directly coupled to backup server 440, backup storage 460, metadata store 465, and/or network storage 470, and so on.

Examples of the Formation of an Eventually-Complete Backup

As noted, there are numerous situations in which, for a variety of reasons, a data backup may need to be interrupted. For example, the first full backup can be extensive in any backup system, because the first full backup includes the given dataset in its entirety. In a continuous data protection system, a change tracker (also referred to as a change block tracker, an input/output (I/O) tap, and/or comparable descriptions) is installed between and application and a storage system. Such a change tracker passes the data being written to the computer system's storage system, and also to a gateway that logs the data to a staging area. The gateway then periodically sends the data to a backup system. In such architectures, there are a number of scenarios in which completing the backup can prove problematic, which include initial full synchronization (entailing the backup of the entire dataset in question) and network/storage issues resulting from failures, insufficient storage, the frequency of right operations, and the like. Problems can also result simply from the amount of data being backed up and/or the frequency with which such data is subject to change. In the aforementioned scenarios, the interruption (or need to interrupt) a given backup, whether due to the backup window, overall data transfer rate, and/or data storage being insufficient, results in an inability to create a backup image that is complete (that is to say, is a complete backup of the data to be backed up).

As also noted, according to embodiments such as those described herein, a mechanism is provided that allows a backup system according thereto to account for such complications. To accomplish this end, embodiments such as those described herein provide for the creation of partial backup images that reflect the state of a dataset at a given time, despite having been created at different points in time, until the dataset's data has been backed up in what is referred to herein as an eventually-complete backup. As will be appreciated in light of the present disclosure, such a backup is referred to herein as "eventually-complete" because methods and systems such as those described herein produce a complete backup at some point in time in the future (e.g., as compared to the point in time defined by the state of the data being backed up). To this end, backup images produced at a given point in time that are not complete, are marked as being "partial" (and so, "partial" backup images" or thus generated). At a subsequent point in time, the last partial backup image is generated, and the set of partial backup images that constitute the backup are marked as being "complete" (and so, a complete backup). Thus, the set of partial backup images created cannot be treated as complete and consistent until the last of these partial backup images has been generated, at which time the backup these partial backup images represent can be used to restore the dataset in question.

With regard to backups that failed to complete within a given backup window, a variety of scenarios exist. In the manner noted, with respect to a backup window of a given size (e.g., a certain number of hours in length), backups of large data sets may require more time than the allotted time provided by the backup window. Traditionally, if a backup job required more than the allotted time, the backup job would fail, and be restarted during the next scheduled backup. Using the methods and systems for eventually-complete backups such as those described herein, the incomplete data transfer in the backup window is marked as "partial," in the backup continued at the next opportunity. Resumption, from where the backup left off in the earlier backup, during the next backup window allows for the eventual completion of the backup process, even for large datasets. Such resumption can be accomplished by, for example, implementing checkpoint restart through the maintenance of information indicating the progress made in generating the previous partial backup image.

Methods and systems such as those described herein also provide advantages in systems in which snapshots are used. As noted, the use of snapshots, while advantageous in certain situations, is not without overhead, both in terms of storage space (resulting from the need to maintain information regarding copied/written data) and resource consumption (e.g., with regard to data fragmentation). An example of a backup system in which such considerations are pertinent is backup system 400. As noted in connection therewith, the snapshotting and subsequent backup of data is dependent on the performance of the backup process in question. As noted, in situations in which the amount of data is large and relative terms, the time required for the backup of such a snapshot may exceed that allotted, resulting in either the failure of the backup or the need to maintain the snapshot between backup windows. Neither of these alternatives is desirable. With respect to workloads that provide changes since the last backup (e.g., change block tracking), a snapshot taken to maintain the state of the data in question need not be retained between backup windows. However, in scenarios in which workloads are scanned in order to determine changes to data, while the snapshot can be retained across backup windows, such an alternative is also not without its costs.

Figure 5:
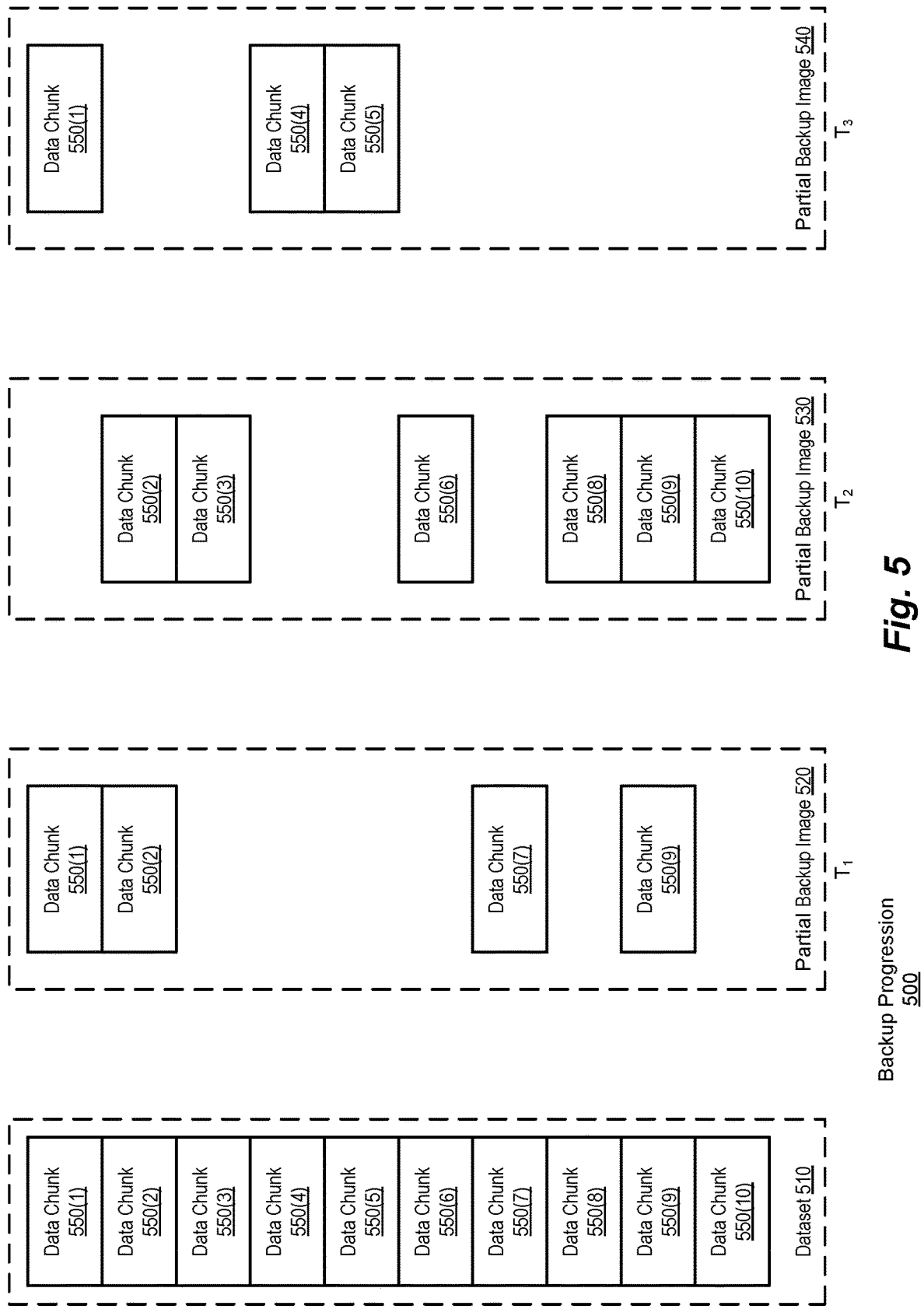
FIG. 5 is a simplified block diagram illustrating a sequence of partial backup images of an eventually-complete backup of a dataset, according to one embodiment.

FIG. 5 is a simplified block diagram illustrating a sequence of partial backup images of an eventually-complete backup of a dataset, according to one embodiment. This being the case, FIG. 5 depicts a backup progression 500. Backup progression 500 depicts a dataset 510 that is to be backed up using methods and systems according to the present disclosure. That being the case, a partial backup image is generated at three times ($T_1$, $T_2$, and $T_3$), and are depicted in FIG. 5 as partial backup images 520, 530, and 550, respectively. Also depicted as being included in dataset 510 are a number of data chunks (depicted as data chunks 550(1)-(10), and referred to in the aggregate as data chunks 550).

In the example depicted in FIG. 5, a backup is begun at time $T_1$. However, due to a circumstance such as those described earlier, only a portion of dataset 510 is backed up that being the case, partial backup image 520 includes data chunks 550(1), 550(2), 550(7), and 550(9). As will be discussed subsequently, the first partial backup image (partial backup image 520) typically includes the data chunks as they existed in dataset 510 originally (although this assumes no changes to data chunks 550 have occurred in the interim). At the next time (time $T_2$), a partial backup image 530 is generated, and includes data chunks 550(2), 550(3), 550(6), 550(8), 550(9), and 550(10). In this case, partial backup image 530 includes data chunks 550(2) and 550(9) as a result of some or all of the data in data chunks 550(2) and 550(9) having changed (i.e., having been subject to write operations). Such changes can become part of a partial backup image as a result of, for example, the operation of a change tracker sending such changes to the continuous data backup gateway in question. Similarly, at the next time (time $T_3$), a partial backup image 540 is generated, and includes data chunks 550(1), 550(4), and 550(5). In the manner just noted, data chunk 550(1) is received, in this example, as a result of including changed data.

As will be appreciated in light of the present disclosure, it will be apparent that there exists the possibility of frequently-changing data causing a situation in which to or more data chunks "flip-flop" by being alternately written (also referred to herein as "thrashing"). Such a situation is an example of a backup process not making progress, a situation in which an administrator can be alerted and, potentially, certain aspects of the backup process tuned. For example, one approach to address such situations is to add a temporal aspect to the backup process, such that changes after a certain point in time are relegated to the next backup process. Alternatively, characteristics the backup process such as backup window size, data chunk size, backup window frequency, and other such backup process characteristics can be adjusted to provide the backup system with the opportunity to return to progressing through the backup of the dataset.

Figure 6:
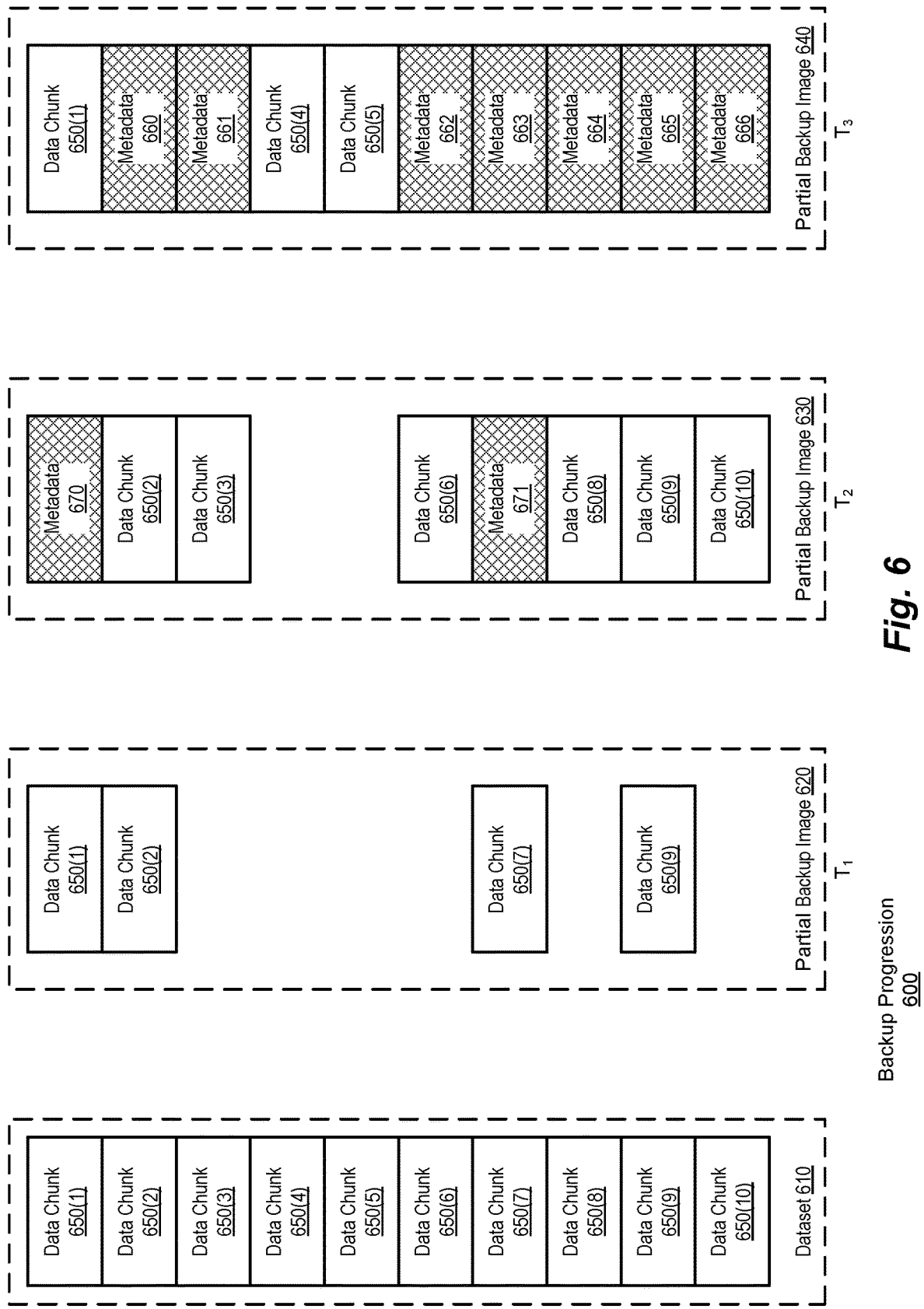
FIG. 6 is a simplified block diagram illustrating a sequence of partial backup images of an eventually-complete backup of a dataset, according to one embodiment.

FIG. 6 is a simplified block diagram illustrating a sequence of partial backup images of an eventually-complete backup of a dataset, according to one embodiment. In the scenario depicted in FIG. 6, partial backup images produced by a backup system such as that depicted in FIG. 2 as backup system 200 are depicted. In the example depicted in FIG. 6, a backup is begun at time $T_1$. However, due to a circumstance such as those described earlier, only a portion of dataset 610 is backed up that being the case, partial backup image 620 includes data chunks 650(1), 650(2), 650(7), and 650(9). As will be discussed subsequently, the first partial backup image (partial backup image 620) typically includes the data chunks as they existed in dataset 610 originally (although this assumes no changes to data chunks 650 have occurred in the interim). At the next time (time $T_2$), a partial backup image 630 is generated, and includes data chunks 650(2), 650(3), 650(6), 650(8), 650(9), and 650(10). In this case, partial backup image 630 includes data chunks 650(2) and 650(9) as a result of some or all of the data in data chunks 650(2) and 650(9) having changed (i.e., having been subject to write operations). Such changes can become part of a partial backup image as a result of, for example, the operation of a change tracker sending such changes to the continuous data backup gateway in question. Similarly, at the next time (time $T_3$), a partial backup image 640 is generated, and includes data chunks 650(1), 650(4), and 650(5). In the manner just noted, data chunk 650(1) is received, in this example, as a result of including changed data.

With further regard to FIG. 6, and in contrast to backup progression 500, the partial backup images generated in backup progression 600 each include metadata that indicates the existence of the latest data chunk (for the data chunk in question) and the partial backup image in which that data chunk may be found. Such a backup stream (e.g., with particular focus on partial backup image 640) can be generated by a backup system such as backup system 300. As was noted in connection with FIG. 3, a backup stream (e.g. backup stream 320) can be generated as an update set (e.g. update set 180) stored in a buffer (e.g., buffer 166 or buffer 315), and then stored (e.g., as in a storage system such as storage system 350) as a backup image (such as backup image 340). As will be appreciated in light of the present disclosure, then, partial backup image 630 includes metadata 670 and 671, which indicate existing data chunks in partial backup image 620 (data chunk 650(1) and data chunk 650(7)), while metadata 660, 661, 662, 663, 664, 665, and 666 of partial backup image 640 identify prospective data chunks in partial backup image 630 (data chunks 650(2), 650(3), 650(6), 650(8), 650(9), and 650(10)). As will be appreciated, certain data chunks, while being represented by metadata in certain of the partial backup images generated in this fashion, may end up ultimately being replaced with new data (e.g., data chunk 650(1)). Further, certain other data chunks, while being represented by metadata in certain of the partial backup images generated in this fashion, the end up identifying data chunks in much earlier partial backup images (e.g., data chunk 650(7)). In such case, the metadata involved (metadata 663 and metadata 671) may all identify the data chunk in question (e.g., data chunk 650(7)), or may identify simply the data chunk or metadata in the partial backup image prior. As will also be appreciated, in terms of data chunks (data chunks containing "actual" data) and metadata (information identifying data chunks containing "actual" data), the last partial backup image completing the backup can be viewed as a complete backup by virtue of its containing such data and metadata. In the manner noted, such a complete backup thus allows for the restoration of the dataset in question.

The foregoing can be viewed in terms of the architecture depicted in backup system 100 of FIG. 1, in which change tracker 150 intercepts write operations intended for VMDKs 157, and not only passes these right operations to storage system 155 for application to VMDKs 157, but also to continuous data backup gateway 120 (and specifically, for storage in change tracking log 168 maintained in gateway storage system 164), as noted. As also noted, change tracker 150, in sending data to continuous data backup gateway 120 change tracker 150 communicates with backup management unit 160. In certain embodiments, when the amount of data stored in change tracking log 168 (stored in gateway storage system 164 of continuous data backup gateway 120) reaches a threshold amount, backup management unit 160 can initiate data backup of data chunks 170 (as update set 180) to backup storage server 130. This data backup may be marked as partial (a partial backup image), if the backup of dataset is not yet complete or if the dataset is in an inconsistent state. In so doing, criteria such as recovery point objectives (RPOs) can be considered in the operation of backup management unit 160, in order to modulate the frequency with which such partial backup images are generated. One example of an RPO is the age of files to be recovered from backup storage for normal operations to resume, if a computer, system, or network goes down as a result of a hardware, program, or communications failure. Such considerations can be used to tune various aspects of a backup system according to embodiments such as those described herein, and can include data chunk size, backup frequency (e.g., as by way of the aforementioned threshold), backup window size, available storage, and other such factors.

Example Backup Processes

Figure 7:
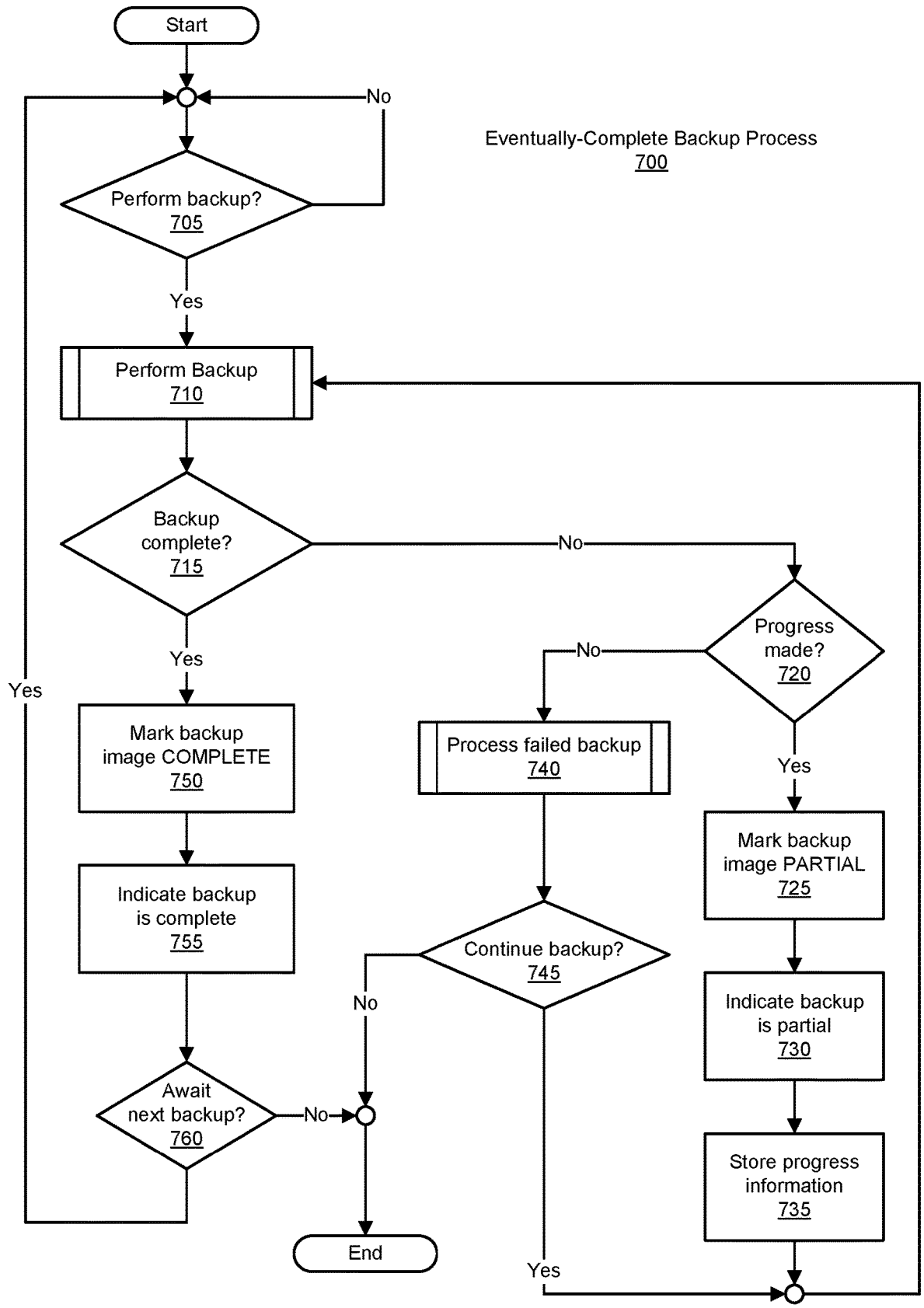
FIG. 7 is a flow diagram illustrating an example of a eventually-complete backup process, according to one embodiment.

FIG. 7 is a flow diagram illustrating an example of a eventually-complete backup process, according to one embodiment. FIG. 7 thus depicts an eventually-complete backup process 700. Eventually-complete backup process 700 begins with a determination as to whether a backup is to be performed (705). Eventually-complete backup process 700 loops until such time as a backup is to be performed. Once an indication is received that a backup is to be performed, eventually-complete backup process 700 proceeds with the process of performing a backup (710). An example of such a backup process is described in further detail in connection with FIGS. 8A and 8B, subsequently.

Upon the conclusion of the backup process, a determination is made as to whether the backup is now complete (715). In the case in which the backup is not complete (i.e., is incomplete), a determination is made as to whether the backup process has made progress in backing up the dataset in question (720). If the backup process has made progress, the backup image in question is marked "PARTIAL" (725) and an indication to this effect is generated (730). Also at this time, information regarding the backup process' progress is stored (e.g., as checkpoint information or the like) (735). Eventually-complete backup process 700 then loops to performing the backup process again (710). It will be appreciated that, in looping to process 710, eventually-complete backup process 700 will typically not go directly to this operation, but will indeed await the next scheduled backup window, administrator intervention, or some other comparable event.

In the case in which the backup process has not made progress (or his made only insufficient progress), a process for determining the cause of the failed backup and generating one or more alerts (as might be provided to one or more administrators) (740). An example of such a backup failure process is described in further detail in connection with FIGS. 9A and 9B, subsequently. Depending on the outcome of this backup failure process, a determination is made as to whether the backup should be continued (745). In the case in which eventually-complete backup process 700 is to continue, eventually-complete backup process 700 loops to performing the backup process (710), in the manner noted. Alternatively, a determination may be made that eventually-complete backup process 700 cannot continue, in which case eventually-complete backup process 700 concludes.

Once the backup process is complete (715), the last partial backup image is marked as "COMPLETE" (750), and an indication to this effect generated (755). A determination is then made as to whether another backup is to be awaited (760). In the case in which additional backups are to be performed, eventually-complete backup process 700 loops to awaiting an indication to that effect (705). Alternatively, if no further backups are to be performed, eventually-complete backup process 700 concludes.

Figure 8A:
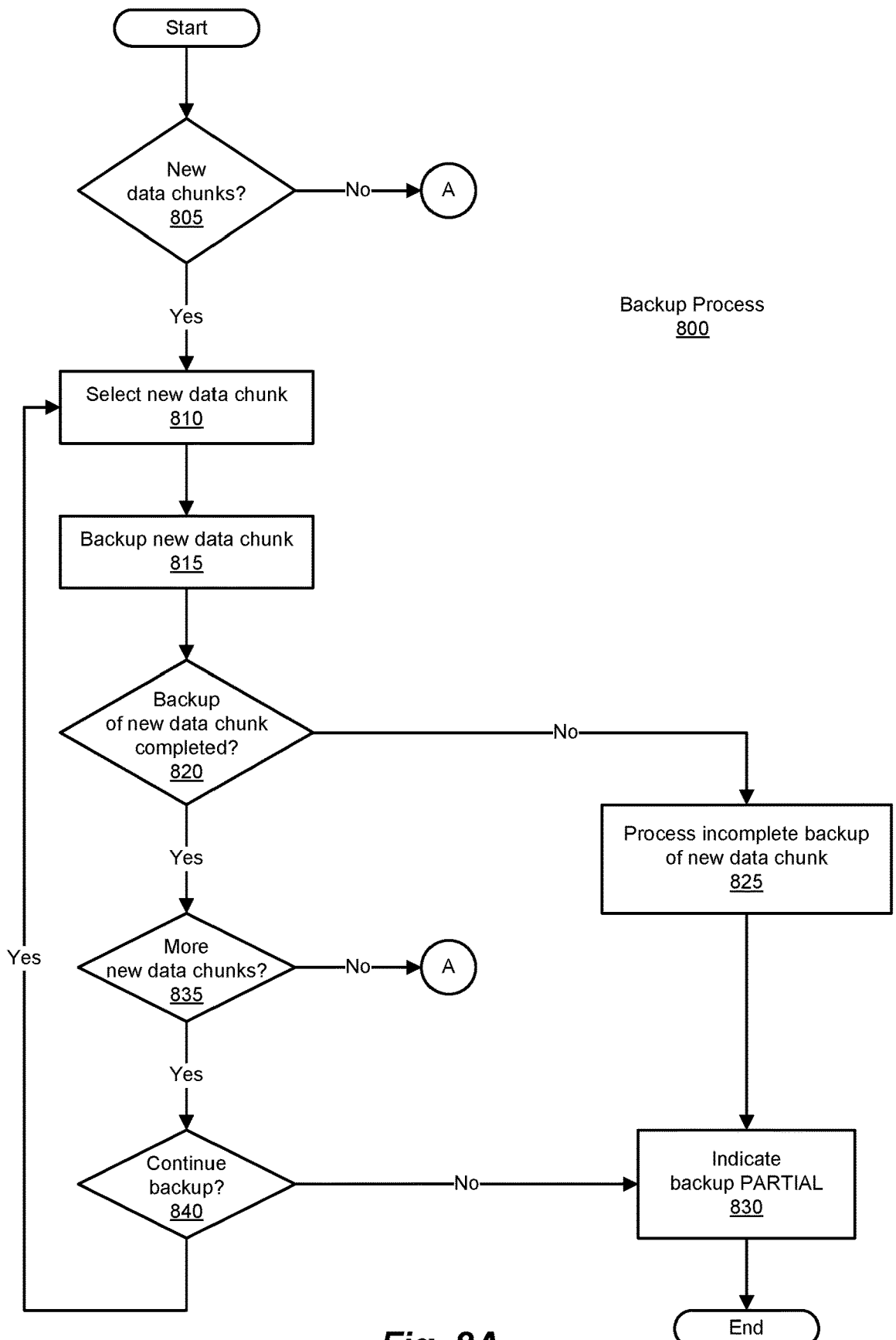
FIGS. 8A and 8B depict a flow diagram illustrating an example of a backup process, according to embodiments of methods and systems such as those disclosed herein.
Figure 8B:
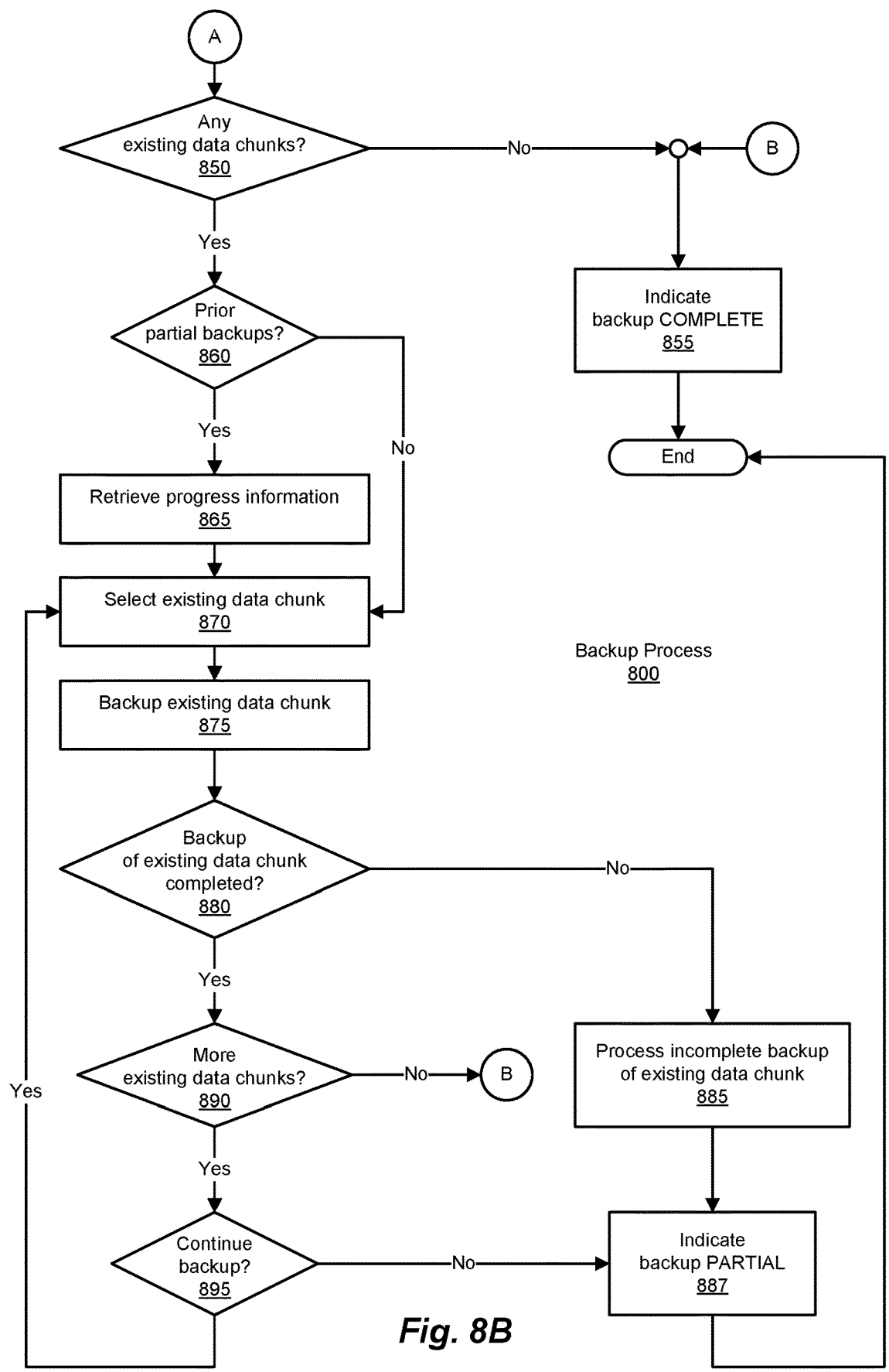

FIGS. 8A and 8B depict a flow diagram illustrating an example of a backup process, according to embodiments of methods and systems such as those disclosed herein. FIG. 8A thus depicts a backup process 800. Backup process 800 begins with a determination as to whether any new data chunks exist in the dataset (805). In the case in which there are no new data chunks in the dataset, backup process 800 proceeds to the remainder of backup process 800 depicted in FIG. 8B, described subsequently.

In the case in which data from the dataset to be backed up includes one or more new data chunks, one of these new data chunks is selected (810). The selected new data chunk is then backed up (815). A determination is then made as to whether the backup of the new data chunk completed successfully (820). In the case in which the backup of the new data chunk did not complete successfully (e.g., as a result of encountering the end of a backup window, a storage threshold, or other such interruption to the backup process), backup process 800 proceeds to the processing of the incomplete backup of the new data chunk (825). Such processing can include, for example, removal of the incomplete data chunk's data from the partial backup image in question or other such operations. An indication as to the backup image being "PARTIAL" is then generated (830). Backup process 800 then concludes.

In the case in which the backup of the new data chunk is successfully completed (820), a determination is made as to whether more new data chunks remain to be backed up (835). In the case in which additional new data chunks remain to be backed up, a determination is made as to whether the backup operation should continue (840). In the case in which, for whatever reason, backup process 800 should terminate, backup process 800 proceeds with the generation of an indication as to the backup image in question being "PARTIAL" (830), and then concludes. Alternatively, if the backup operation is to continue (840), backup process 800 loops to the selection of the next new data chunk (810), and backup process 800 continues.

At some point, having processed the new data chunks in question (835) or there being no new data chunks to backup (805), backup process 800 proceeds to the remainder of backup process 800 depicted in FIG. 8B. FIG. 8B depicts the remainder of backup process 800 and begins with a determination as to whether the remainder of the dataset includes any existing data chunks that remain to be backed up (850). In the case in which no further existing data chunks remain to be backed up (and, having reached this point, no new data chunks remain to be backed up), backup process 800 generates an indication that the backup in question is now "COMPLETE" (855). Backup process 800 then concludes.

In the case in which one or more existing data chunks remain to be backed up, backup process 800 proceeds to a determination as to whether one or more prior partial backups have been performed (860). In the case in which one or more prior partial backups have been performed, progress information stored as a result of those prior partial backups is retrieved (865). This allows backup process 800 to work its way through existing data in the dataset being backed up, in addition to capturing new data in the aforementioned manner.

Once the requisite progress information has been retrieved (or a determination has been made that no prior partial backups of been performed), one of the existing data chunks is selected (870). A backup of the selected existing data chunk is then made (875). A determination is then made as to whether the existing data chunk has been successfully and completely backed up (880). In the case in which backup of the existing data chunk was interrupted, the incomplete backup is processed (885). An indication is then made as to the backup performed being "PARTIAL" (887), and backup process 800 concludes.

In the case in which the backup of the existing data chunk was completed successfully, a determination is made as to whether one or more existing data chunks remain to be backed up (890). If one or more existing data chunks remain to be backed up, backup process 800 proceeds to a determination as to whether backup operation should continue (895). Such is the case in which the last existing data chunk was successfully backed up, but no further data chunks can be backed up. In the case in which backup process 800 is to continue, backup process 800 loops to the selection of the next existing data chunk (870). Alternatively if the backup is not to continue, backup process 800 proceeds to generating an indication that the backup in question is "PARTIAL" (887), and backup process 800 concludes.

However, if no further existing data chunks remain to be backed up (890), backup process 800 proceeds with the generation of an indication as to the backup being "COMPLETE" (855), and then concludes.

Figure 9A:
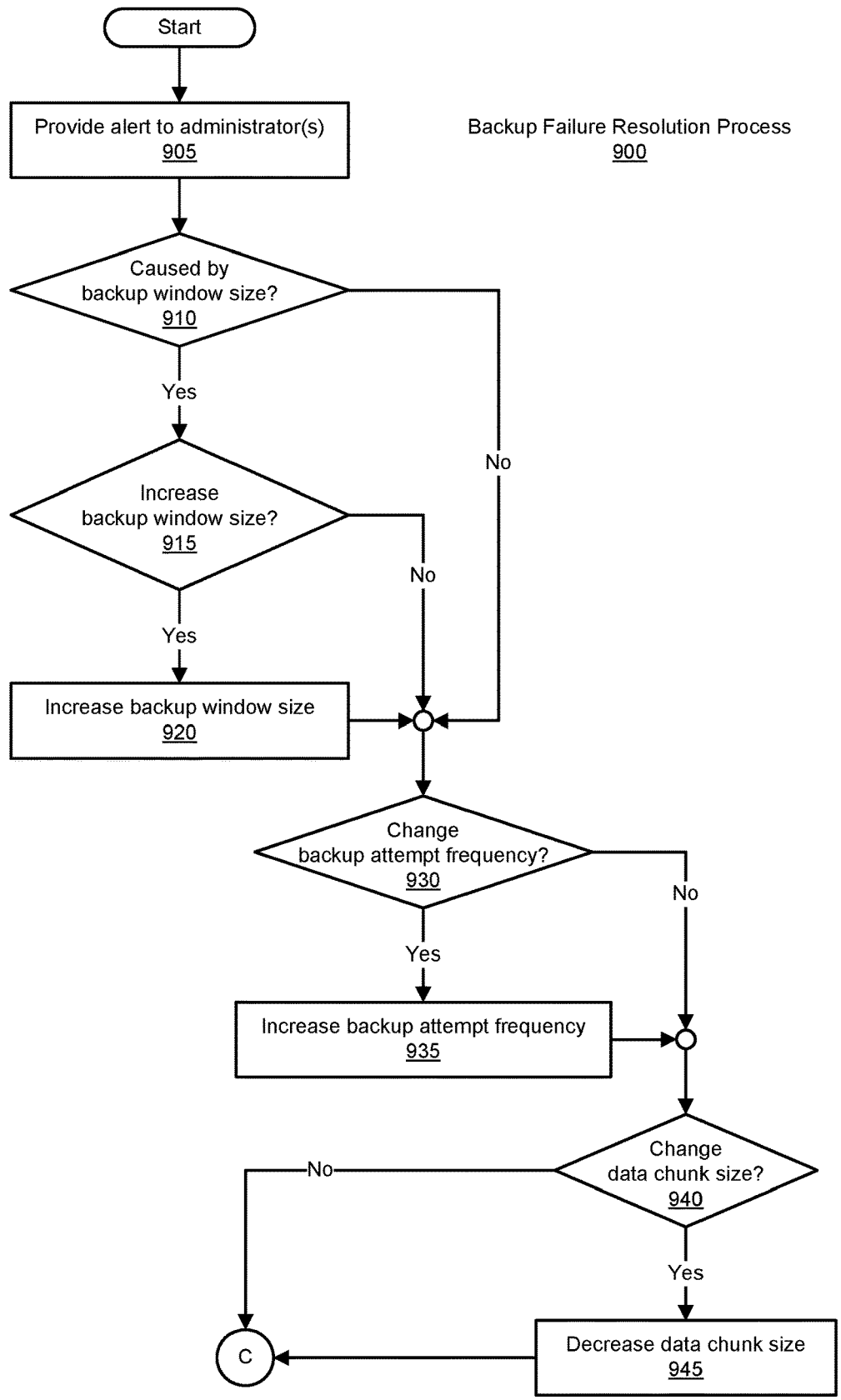
FIGS. 9A and 9B depict a flow diagram illustrating an example of a backup failure process, according to embodiments of methods and systems such as those disclosed herein.
Figure 9B:
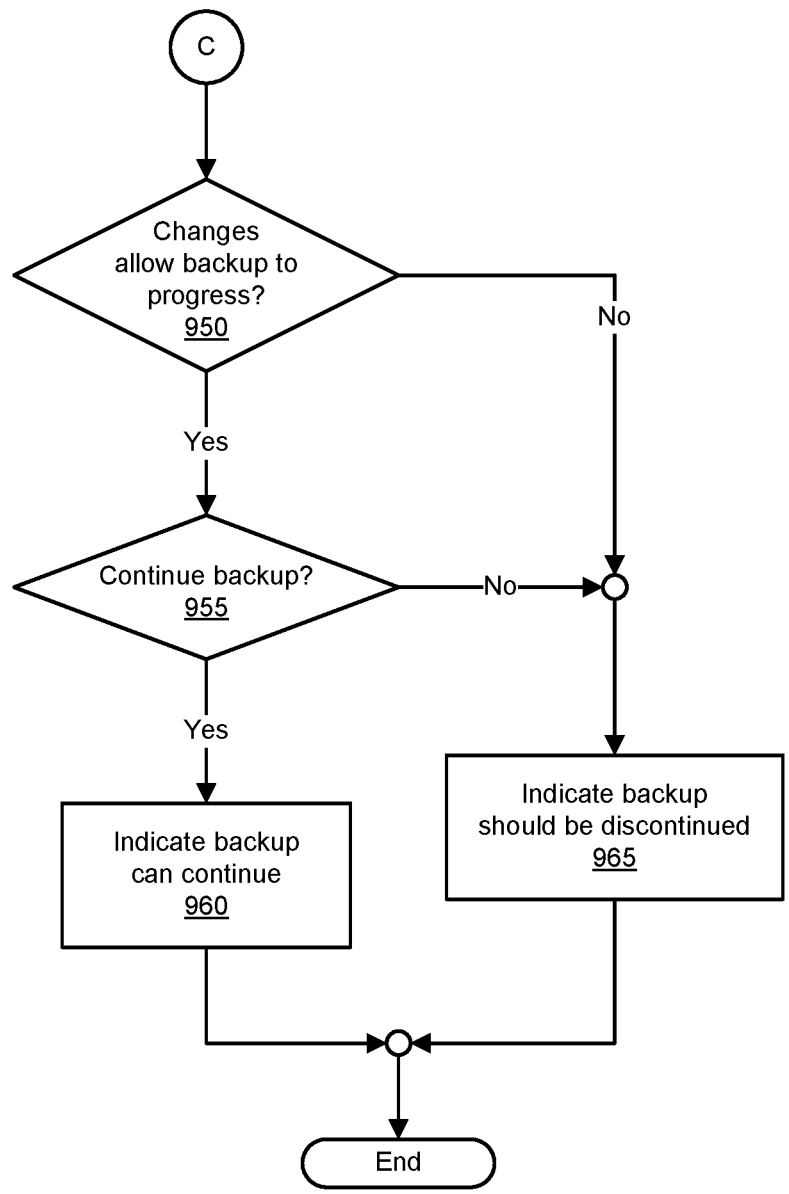

FIGS. 9A and 9B depict a flow diagram illustrating an example of a backup failure process, according to embodiments of methods and systems such as those disclosed herein. FIG. 9A thus depicts a backup failure resolution process 900. Backup failure resolution process 900 begins with the provision of an alert to one or more administrators (905). A determination is then made as to whether the failure was caused by the size of the backup window (e.g., in terms of the period of time available in which to perform the backup) (910). If a determination is made that the failure had to do with the backup window size, a determination is made as to whether the situation can be remedied by increasing the backup window size (915). In the case in which an increase in backup window size may prove beneficial, the backup window size is increased (920).

If either of the foregoing are not found to be beneficial, or the backup window size is changed, backup failure resolution process 900 proceeds to making a determination as to whether the backup attempt frequency should be changed to address the problems encountered (930). If it appears that such a change is warranted, the backup attempt frequency can be increased (935). Alternatively, it will be appreciated that backup window size and backup attempt frequency can be adjusted simultaneously, in order to provide smaller/more frequent backup windows, larger/less frequent backup windows, or some combination thereof.

Backup failure resolution process 900 can also consider whether a change to the size of the data chunks employed can be adjusted to provide sufficient progress (940). In the case in which data chunk size can be adjusted to good effect, the data chunk size can be, for example, decreased (945). As will be appreciated, a smaller data chunk size may provide a lower probability of new data causing the aforementioned thrashing, but will likely also incur additional resource consumption.

FIG. 9B depicts the remainder of backup failure resolution process 900. Backup failure resolution process 900 thus proceeds to a determination as to whether the any of the aforementioned changes instituted will allow the backup in question to progress (950). In the case in which it is determined that such changes will not allow the backup to progress sufficiently, backup failure resolution process 900 generates an indication that the backup should be discontinued (965), and then concludes.

In the case in which the changes made will allow backup failure resolution process 900 to continue, a determination is made as to whether, based on the partial backup images generated to this point, the backup can be continued successfully (955). In the case in which the backup in question cannot be continued, backup failure resolution process 900 generates an indication that the backup in question should be discontinued (965), and then concludes.

Alternatively, if the changes made will allow the backup to make sufficient progress and the backup should be continued, backup failure resolution process 900 generates an indication that the backup in question can continue (960), and then concludes. Having made such indications, backup failure resolution process 900 facilitates the proper handling of the backup in question in eventually-complete backup process 700.

Figure 10:
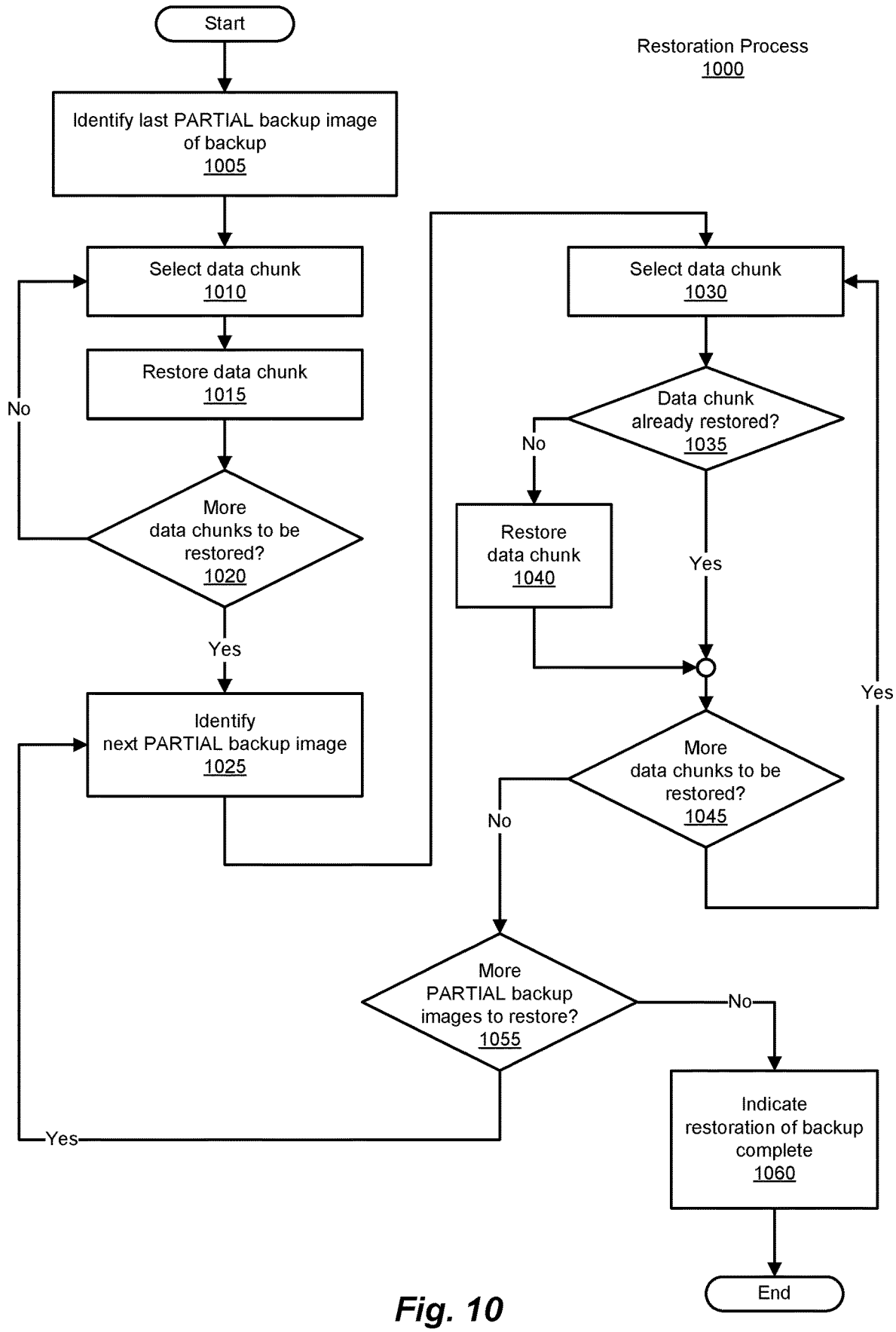
FIG. 10 is a flow diagram illustrating an example of a restoration process, according to one embodiment.

FIG. 10 is a flow diagram illustrating an example of a restoration process, according to one embodiment. FIG. 10 thus depicts a restoration process 1000. As noted earlier, such restoration can be performed on one or more "PARTIAL" backups, either individually or as a "COMPLETE" backup, although the manner in which a given backup is restored will be dependent upon the structure of the partial backup images involved (e.g., such as between the partial backups depicted in FIGS. 5 and 6). Further, as also noted, if the data chunks of a given partial backup image are unitary and internally consistent, such data chunks can be restored from their respective partial backup image individually (i.e., without the need for a full restoration of the "COMPLETE" backup).

Restoration process 1000 begins with the identification of the last partial backup image of the backup in question (1005). Next, a data chunk of this last partial backup image is selected (1010). The selected data chunk is then restored (1015). A determination is then made as to whether more data chunks of the last partial backup image remain to be restored (1020). If further data chunks remain to be restored, restoration process 1000 loops to the selection of the next data chunk (1010) and its restoration (1015).

Once the data chunks of the last partial backup image have been restored, restoration process 1000 proceeds to the identification of the next partial backup image in the backup (1025). As before, a data chunk of the next partial backup image identified is then selected (1030). A determination is then made as to whether the selected data chunk has already been restored as part of, for example, the restoration of another partial backup image (1035). In the case in which the selected data chunk has not yet been restored, restoration process 1000 proceeds with the restoration of the selected data chunk (1040).

Restoration process 1000 then proceeds to a determination as to whether any data chunks of the partial backup image identified remain to be restored (1050). If further data chunks remain in the partial backup image identified, restoration process 1000 loops to the selection of the next data chunk of the partial backup image in question (1030), and restoration process 1000 proceeds.

Alternatively, if no further data chunks remain for restoration in the partial backup image identified, restoration process 1000 proceeds to a determination as to whether additional partial backup images remain to be restored (1055). If further partial backup images remain in the completed backup, restoration process 1000 proceeds to the identification of the next partial backup image (1025). Alternatively, if no further partial backup images remain to be restored, restoration process 1000 proceeds with the generation of an indication that the restoration of the backup in question is now complete (1060). Restoration process 1000 then concludes.

As will be appreciated in light of the present disclosure, the depiction of restoration process 1000 in FIG. 10 is directed to the restoration of a complete backup from a number of partial backup images such as those depicted in FIG. 5. As noted in connection with FIG. 6, the question of whether a data chunk has already been restored is inapplicable. In the scenario described in connection with FIG. 6, the data chunks in the last partial backup image are used in combination with the data chunks identified by the metadata in the last partial backup image (whether such metadata identifies data chunks in earlier partial backup images directly, or simply allows for the chain of metadata to be followed to such data chunks). Restoration process 1000 can address such scenarios with minor modifications that will be appreciated in view of FIGS. 6 and 10, among others.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus is illustrated for ease of understanding, it should be understood that the system buses may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 110), one or more applications, and data. Examples of such computing and network environments are described below with reference to FIGS. 11 and 12.

Figure 11:
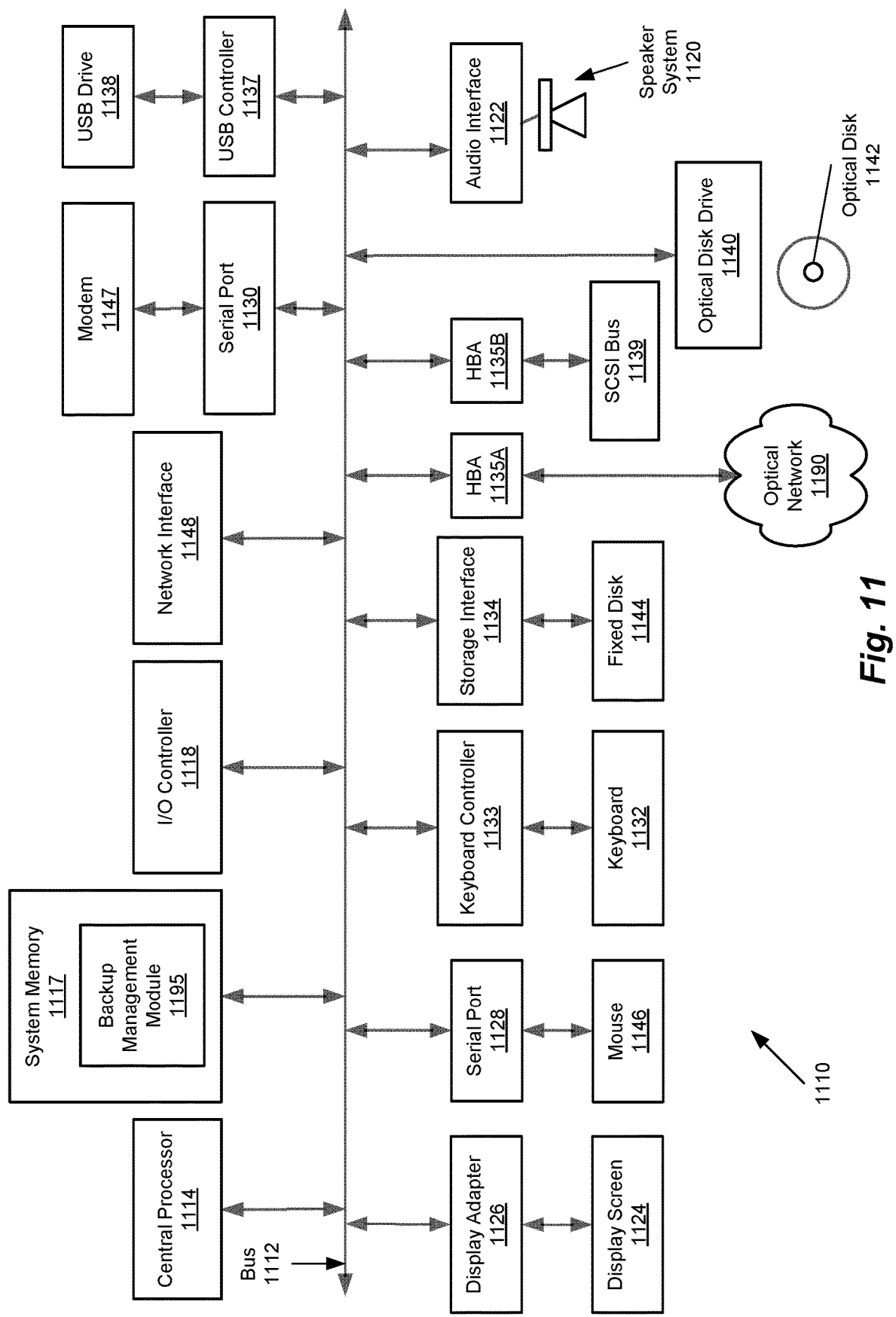
FIG. 11 is a simplified block diagram illustrating components of an example computer system suitable for implementing embodiments of the present disclosure, according to one embodiment.

FIG. 11 depicts a block diagram of a computer system 1110 suitable for implementing aspects of the systems described herein. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with a optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like. Also depicted as part of computer system 1110 is a backup management module 1195, which is resident in system memory 1117 and provides functionality and operations comparable to the backup processes described earlier herein.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 will be readily understood in light of the present disclosure. Code to implement portions of the systems described herein can be stored in computer-readable storage media such as one or more of system memory 1117, fixed disk 1144, optical disk 1142, or USB drive 1138. The operating system provided on computer system 1110 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
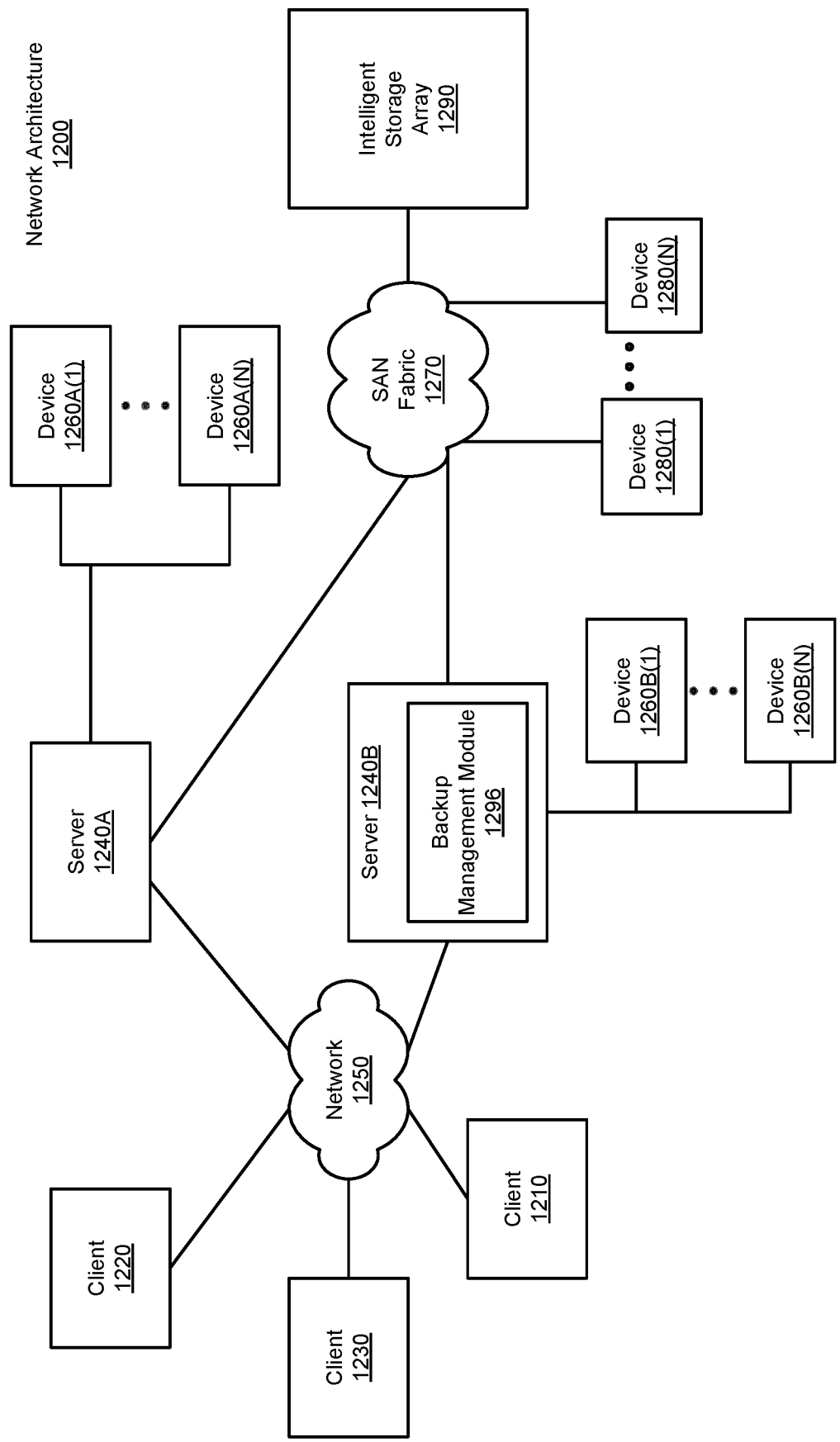
FIG. 12 is a simplified block diagram illustrating components of an example computer system suitable for implementing embodiments of the present disclosure, according to one embodiment.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220 and 1230 via network 1250. An intelligent storage array 1290 is also shown as an example of a specific storage device accessible via SAN fabric 1270.

Also depicted as part of network architecture 1200 is a backup management module 1296 (installed in server 1240B), which are comparable in function and operation to various of the deduplication management modules described earlier herein. For example, using the components depicted in FIG. 6, client deduplication management module 1295 can provide functionality associated with the generation of backup 605 (as well as the segmentation of backup 605 into data segments 610), sample window 615, and fingerprint generation (e.g., as by figure print generator 620). Further, server deduplication management module 1296 can support storage and maintenance of fingerprint catalog 630, as well as the functionalities provided by container usage retrieval unit 635, container usage pattern analyzer 640, distance determination unit 660, backup selection unit 670, and provide for the prefetching of such backups.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   initiating a backup operation, wherein
      the backup operation is one of a plurality of backup operations of a backup,
      the backup comprises a plurality of partial backups,
      the plurality of backup operations are configured to back up a dataset,
      the dataset comprises a plurality of data chunks, and
      the backup operation produces a partial backup of the plurality of partial backups;
   selecting a selected data chunk of the plurality of data chunks;
   determining whether the selected data chunk was backed up in a previous partial backup of the plurality of partial backups;
   in response to a determination that the selected data chunk was not backed up in a previous partial backup of the plurality of partial backups,
      storing a backup image of data of the selected data chunk in the partial backup;
   in response to a determination that the selected data chunk was backed up in a previous partial backup of the plurality of partial backups,
      determining whether data of the selected data chunk has been modified since the previous partial backup was created, and
      in response to a determination that the data of the selected data chunk was modified since the previous partial backup was created,
         storing the backup image of the data of the selected data chunk in the partial backup;
   detecting termination of the backup operation;
   determining whether the backup operation backed up the dataset completely;
   in response to a determination that the backup operation did not result in the dataset being backed up completely,
      generating an indication that the backup is not complete; and in response to a determination that the backup operation did result in the dataset being backed up completely, generating an indication that the backup is complete.

2. The method of claim 1, wherein the method further comprises:
in response to the indication that the backup is not complete, storing progress information, wherein
the progress information indicates data of the dataset that has been backed up.

3. The method of claim 1, wherein
the determining whether the selected data chunk was backed up in the previous partial backup of the plurality of partial backups comprises
determining whether the previous partial backup comprises
the backup image of the data of the selected data chunk, or
a reference to a backup image of the data of the selected data chunk in another previous partial backup of the plurality of partial backups.

4. The method of claim 3, wherein
upon the dataset being backed up completely, the backup comprises the plurality of partial backups.

5. The method of claim 3, wherein
the partial backup comprises a backup image of at least one data chunk of the plurality of data chunks.

6. The method of claim 5, wherein
the partial backup further comprises one or more references to backup images of at least one other data chunk in the another previous partial backup.

7. The method of claim 6, wherein
the selected data chunk is one of a new data chunk or an existing data chunk.

8. The method of claim 1, wherein
the termination is a result of an end of a backup window.

9. The method of claim 1, further comprising:
retrieving progress information; and
causing the backup operation to be initiated at a point in the dataset indicated by the progress information.

10. A non-transitory computer-readable storage medium, comprising program instructions, which, when executed by one or more processors of a computing system, perform a method comprising:
initiating a backup operation, wherein
the backup operation is one of a plurality of backup operations of a backup,
the backup comprises a plurality of partial backups,
the plurality of backup operations are configured to back up a dataset,
the dataset comprises a plurality of data chunks, and
the backup operation produces a partial backup of the plurality of partial backups;
selecting a selected data chunk of the plurality of data chunks;
determining whether the selected data chunk was backed up in a previous partial backup of the plurality of partial backups;
in response to a determination that the selected data chunk was not backed up in a previous partial backup of the plurality of partial backups,
storing a backup image of data of the selected data chunk in the partial backup;
in response to a determination that the selected data chunk was backed up in a previous partial backup of the plurality of partial backups,
determining whether data of the selected data chunk has been modified since the previous partial backup was created, and
in response to a determination that the data of the selected data chunk was modified since the previous partial backup was created,
storing the backup image of the data of the selected data chunk in the partial backup;
detecting termination of the backup operation;
determining whether the backup operation backed up the dataset completely;
in response to a determination that the backup operation did not result in the dataset being backed up completely,
generating an indication that the backup is not complete; and
in response to a determination that the backup operation did result in the dataset being backed up completely,
generating an indication that the backup is complete.

11. The non-transitory computer-readable storage medium of claim 10, wherein and the method further comprises:
in response to the indication that the backup is not complete, storing progress information, wherein
the progress information indicates data of the dataset that has been backed up.

12. The non-transitory computer-readable storage medium of claim 10, wherein
the determining whether the selected data chunk was backed up in the previous partial backup of the plurality of partial backups comprises
determining whether the previous partial backup comprises
the backup image of the data of the selected data chunk, or
a reference to a backup image of the data of the selected data chunk in another previous partial backup of the plurality of partial backups,
upon the dataset being backed up completely, the backup comprises the plurality of partial backups.

13. The non-transitory computer-readable storage medium of claim 12, wherein
the partial backup comprises a backup image of at least one data chunk of the plurality of data chunks.

14. The non-transitory computer-readable storage medium of claim 13, wherein
the partial backup further comprises one or more references to backup images of at least one other data chunk in the another previous partial backup.

15. The non-transitory computer-readable storage medium of claim 10, wherein the termination is a result of an end of a backup window.

16. The non-transitory computer-readable storage medium of claim 12, the method further comprising:
retrieving progress information; and
causing the backup operation to be initiated at a point in the dataset indicated by the progress information.

17. A computing system comprising:
one or more processors; and
a computer-readable storage medium coupled to the one or more processors, comprising program instructions, which, when executed by the one or more processors, perform a method comprising
initiating a backup operation, wherein
the backup operation is one of a plurality of backup operations of a backup,
the backup comprises a plurality of partial backups, the plurality of backup operations are configured to back up a dataset, the dataset comprises a plurality of data chunks, and the backup operation produces a partial backup of the plurality of partial backups, selecting a selected data chunk of the plurality of data chunks, determining whether the selected data chunk was backed up in a previous partial backup of the plurality of partial backups, in response to a determination that the selected data chunk was not backed up in a previous partial backup of the plurality of partial backups, storing a backup image of data of the selected data chunk in the partial backup, in response to a determination that the selected data chunk was backed up in a previous partial backup of the plurality of partial backups, determining whether data of the selected data chunk has been modified since the previous partial backup was created, and in response to a determination that the data of the selected data chunk was modified since the previous partial backup was created, storing the backup image of the data of the selected data chunk in the partial backup, detecting termination of the backup operation, determining whether the backup operation backed up the dataset completely, in response to a determination that the backup operation did not result in the dataset being backed up completely, generating an indication that the backup is not complete, and in response to a determination that the backup operation did result in the dataset being backed up completely, generating an indication that the backup is complete.

18. The computing system of claim 17, wherein the method further comprises:

in response to the indication that the backup is not complete, storing progress information, wherein the progress information indicates data of the dataset that has been backed up.

19. The computing system of claim 17, wherein the determining whether the selected data chunk was backed up in the previous partial backup of the plurality of partial backups comprises determining whether the previous partial backup comprises the backup image of the data of the selected data chunk, or a reference to a backup image of the data of the selected data chunk in another previous partial backup of the plurality of partial backups, and the partial backup comprises a backup image of at least one data chunk of the plurality of data chunks, and one or more references to backup images of at least one other data chunk in the another previous partial backup, and the selected data chunk is one of a new data chunk or an existing data chunk.

20. The computing system of claim 17, wherein the method further comprises:

retrieving progress information; and causing the backup operation to be initiated at a point in the dataset indicated by the progress information.

* * * * *